United States Patent
Wu et al.

(10) Patent No.: US 11,148,833 B1
(45) Date of Patent: Oct. 19, 2021

(54) SPACECRAFT PROPELLANT MANAGEMENT SYSTEM

(71) Applicant: Space Systems/Loral, LLC, Palo Alto, CA (US)

(72) Inventors: Gordon Wu, Lafayette, CO (US); Maria Eugenia Torres, San Francisco, CA (US); Diego A. Melani, Palo Alto, CA (US); Jeff Aaron Baldwin, Sunnyvale, CA (US); David Marlow, Redwood City, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 588 days.

(21) Appl. No.: 15/985,357

(22) Filed: May 21, 2018

(51) Int. Cl.
*B64G 1/40* (2006.01)
*B64G 1/26* (2006.01)
*B64G 1/00* (2006.01)

(52) U.S. Cl.
CPC ............. *B64G 1/402* (2013.01); *B64G 1/007* (2013.01); *B64G 1/26* (2013.01); *B64G 1/405* (2013.01)

(58) Field of Classification Search
CPC ......... F03H 1/0012; B64G 1/402; F02K 9/44; F02K 9/50; F02K 9/56; F02K 9/563; F02K 9/566; F02K 9/58
See application file for complete search history.

(56) References Cited

U.S. PATENT DOCUMENTS

| | | | |
|---|---|---|---|
| 5,186,007 A | 2/1993 | Takano et al. | |
| 5,809,801 A | 9/1998 | Cates, Jr. et al. | |
| 8,048,211 B2 | 11/2011 | Behruzi et al. | |
| 8,973,873 B2 | 3/2015 | Aston et al. | |
| 9,546,892 B2 | 1/2017 | Kwok | |
| 2003/0005708 A1 | 1/2003 | Beck et al. | |
| 2015/0106039 A1* | 4/2015 | Kwok | B64G 1/402 702/50 |
| 2016/0327029 A1* | 11/2016 | Ziemba | H05H 1/2406 |
| 2016/0376033 A1 | 12/2016 | Ho et al. | |
| 2019/0390662 A1* | 12/2019 | Siddiqui | F03H 1/0093 |

FOREIGN PATENT DOCUMENTS

FR        2802575 A1    6/2001

* cited by examiner

*Primary Examiner* — Gerald L Sung
*Assistant Examiner* — William L Breazeal
(74) *Attorney, Agent, or Firm* — Weaver Austin Villeneuve & Sampson LLP

(57) ABSTRACT

A spacecraft includes a propulsion system including an inert gas stored in a set of pressurant tanks, one or more electric thrusters operable with the inert gas, one or more cold gas thrusters operable with the inert gas; and a pneumatic arrangement including commandable valves.

5 Claims, 6 Drawing Sheets

Detail A

Detail B

Figure 1

Detail C

Detail D

Detail E

Detail F

SPACECRAFT PROPELLANT MANAGEMENT SYSTEM

TECHNICAL FIELD

This invention relates generally to a spacecraft propulsion system, and, more particularly, to techniques for propellant management, where the propellant is a high atomic number inert gas and the propulsion system includes electric thrusters and cold gas thrusters operable with inert gas.

BACKGROUND

The assignee of the present invention manufactures and deploys spacecraft for, inter alia, communications and broadcast services.

Such spacecraft are equipped with on board propulsion systems, including chemical or electric thrusters, for orbit raising from a launch vehicle transfer orbit (or "parking orbit") to an operational orbit, for example, to a geosynchronous orbit; for stationkeeping once disposed in the operational orbit; and for attitude control/momentum management purposes.

Spacecraft thrusters may be broadly categorized as either "chemical" or "electric" based on the respective primary energy source. Chemical thrusters suitable for spacecraft propulsion systems accelerate combustion or decomposition products of propellants such as hydrazine, but such thrusters are generally incapable of operating at a specific impulse ($I_{sp}$) higher than 500 seconds. Electric thrusters may operate at an $I_{sp}$ of 1000-4000 seconds, by using spacecraft power to ionize high atomic number inert gases such as xenon, argon and krypton and accelerate the resulting ions. Spacecraft power constraints, at least, practically constrain thrust levels to well less than one newton.

An electric thruster, as contemplated by the present disclosure, may be or include, for example, a Hall accelerator, a gridded electrostatic accelerator, a cross field (E×B) accelerator, a pulsed plasma thruster, a pulsed inductive thruster, a field-reversed configuration plasma thruster, a wakefield accelerator, a traveling wave accelerator, and an ion cyclotron resonance heater combined with a magnetic nozzle. In some implementations, the electric thruster may be Hall Effect thrusters (HET) such as a stationary plasma thruster (SPT) and may be referred to herein as a "plasma thruster".

Increasingly, "all-electric" spacecraft are desirable in which chemical thrusters and associated tankage are omitted in favor of a spacecraft configuration in which orbit raising, stationkeeping, and normal attitude control/momentum management are all accomplished using only electric thrusters.

To handle contingency situations in which spacecraft attitude control is lost, the spacecraft may include "cold gas" thrusters operable to accelerate the inert gas normally provided to the electric thrusters. Such cold gas thrusters require little power and provide more thrust (and, as a result, better control authority) than typical electric thrusters, at a much lower specific impulse.

SUMMARY

According to some implementations, a spacecraft includes a propulsion system for use during a mission life of a spacecraft. The propulsion system includes an inert gas stored in a set of pressurant tanks; one or more electric thrusters operable with the inert gas; one or more cold gas thrusters operable with the inert gas; and a pneumatic arrangement including commandable valves, the pneumatic arrangement configured such that a first subset of the pressurant tanks is isolatable, by the commandable valves, from a second subset of the pressurant tanks. In a first mission phase, the commandable valves are configured such that the electric thrusters are pneumatically coupled with the second subset of the pressurant tanks and pneumatically isolated from the first subset of the pressurant tanks and such that the cold gas thrusters are pneumatically coupled with the first subset of the pressurant tanks and pneumatically isolated from the second subset of the pressurant tanks. In a second mission phase, subsequent to the first mission phase, the commandable vales are configured such that the electric thrusters and the cold gas thrusters are pneumatically coupled with the first subset of the pressurant tanks and pneumatically isolated from the second subset of the pressurant tanks.

In some examples, for a substantial portion of the first mission phase, a pressure of the inert gas in the first subset of the pressurant tanks may be at least 1.5 times higher than a pressure of the inert gas in the second subset the pressurant tanks.

In some examples, the spacecraft may further include a condenser, configured to scavenge at least a portion of the inert gas from the second subset of the pressurant tanks. In some examples, the condenser may include a pressure vessel and an active thermal control arrangement configured to control a temperature of the condenser. In some examples, the pressure vessel may be selectably coupled with one or more of the pressurant tanks. In some examples, the inert gas may have a condensation temperature above −60 C at a pressure in a range of 70-110 bar, the condenser may include a pressure vessel and an active thermal control arrangement configured to control a temperature of the condenser, and the condenser may be configured to scavenge the portion of the inert gas during the second mission phase by the active thermal control arrangement cooling the pressure vessel to a temperature below the condensation temperature. In some examples, the active thermal control arrangement may include an isothermal mounting panel, one or more heat pipes and a thermostatically controlled heater.

According to some implementations, a propulsion system for use during a mission life of a spacecraft includes an inert gas stored in a set of pressurant tanks; one or more electric thrusters operable with the inert gas; a condenser; and a pneumatic arrangement coupling the pressurant tanks, the electric thrusters and the condenser, the pneumatic arrangement including commandable isolation valves disposed such that each pressurant tank is selectably isolated from or pneumatically coupled with one or both of the condenser and the electric thrusters. The condenser is configured to scavenge a quantity of the inert gas from at least one of the pressurant tanks.

In some examples, in a first mission phase, the commandable valves may be configured such that the condenser is pneumatically coupled with the one or more electric thrusters, and pneumatically isolated from the pressurant tanks, and, in a second mission phase, the commandable valves may be configured such that the condenser is pneumatically isolated from the one or more electric thrusters, and pneumatically coupled with at least one of the pressurant tanks. In some examples, the inert gas may have a condensation temperature above −60 C at a pressure in a range of 70-110 bar, the condenser may include a pressure vessel and an active thermal control arrangement configured to control a temperature of the condenser and the condenser may be configured to scavenge the quantity of the inert gas during the second mission phase by the active thermal control arrangement cooling the pressure vessel to a temperature below the condensation temperature. In some examples, the active thermal control arrangement may include an isothermal mounting panel, one or more heat pipes and a thermostatically controlled heater.

According to some implementations, a method includes operating a spacecraft, the spacecraft having a mission life, and including a propulsion system that includes an inert gas stored in a set of pressurant tanks, at least one electric thruster operable with the inert gas, at least one cold gas thrusters operable with the inert gas, and a pneumatic arrangement including commandable valves, the pneumatic arrangement configured such that a first subset of the pressurant tanks is isolatable, by the commandable valves, from a second subset of the pressurant tanks. Operating the spacecraft includes, in a first mission phase, configuring the commandable valves such that the electric thruster is pneumatically coupled with the second subset of the pressurant tanks and pneumatically isolated from the first subset of the pressurant tanks and such that the cold gas thruster is pneumatically coupled with the first subset of the pressurant tanks and pneumatically isolated from the second subset of the pressurant tanks, and, in a second mission phase, subsequent to the first mission phase, configuring the commandable valves such that the electric thruster and the cold gas thruster are pneumatically coupled with the first subset of the pressurant tanks and pneumatically isolated from the second subset of the pressurant tanks.

In some examples, for a substantial portion of the first mission phase, a pressure of the inert gas in the first subset of the pressurant tanks may be at least 1.5 times higher than a pressure of the inert gas in the second subset the pressurant tanks.

In some examples, the method may further include configuring a condenser to scavenge at least a portion of the inert gas from the second subset of the pressurant tanks. In some examples, the condenser may include a pressure vessel and an active thermal control arrangement configured to control a temperature of the condenser. In some examples, the pressure vessel may be selectably coupled with one or more of the pressurant tanks. In some examples, the inert gas may have a condensation temperature above −60 C at a pressure in a range of 70-110 bar, the condenser may include a pressure vessel and an active thermal control arrangement configured to control a temperature of the condenser, and the condenser may be configured to scavenge the portion of the inert gas during the second mission phase by the active thermal control arrangement cooling the pressure vessel to a temperature below the condensation temperature. In some examples, the active thermal control arrangement may include an isothermal mounting panel, one or more heat pipes and a thermostatically controlled heater.

According to some implementations, a method includes operating a spacecraft, the spacecraft including a propulsion system for use during a mission life of the spacecraft, the propulsion system including: an inert gas stored in a set of pressurant tanks, at least one electric thruster and at least one cold gas thruster operable with the inert gas, a condenser, and a pneumatic arrangement coupling the pressurant tanks, the electric thruster, the cold gas thruster, and the condenser, the pneumatic arrangement including commandable isolation valves disposed such that each pressurant tank is selectably isolated from or pneumatically coupled with the condenser. Operating the spacecraft includes configuring the condenser to scavenge a quantity of the inert gas from at least one of the pressurant tanks.

In some examples, the method may further include, during a thruster operation mission phase, configuring the commandable valves such that the condenser is pneumatically coupled with the electric thruster and the cold gas thruster, and pneumatically isolated from the pressurant tanks, and, during a propellant scavenging mission phase, configuring the commandable valves such that the condenser is pneumatically coupled with at least one of the pressurant tanks.

In some examples, the inert gas may have a condensation temperature above −60 C at a pressure in a range of 70-110 bar, the condenser may include a pressure vessel and an active thermal control arrangement configured to control a temperature of the condenser, and configuring the condenser to scavenge the quantity of the inert gas during the propellant scavenging mission phase may include the active thermal control arrangement cooling the pressure vessel to a temperature below the condensation temperature.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The present inventors have appreciated that during a substantial fraction of a mission life of a typical "all-electric" spacecraft, because cold gas thrusters optimized for operation at pressures above 100 bar become ineffective at pressures below 25-35 bar, contingency situations may arise in which the cold gas thrusters are not effectively available.

To mitigate this problem, the presently disclosed techniques preserve availability of relatively high pressure xenon for contingency use by the cold gas thrusters until nearly the end of spacecraft life.

Figure 1:
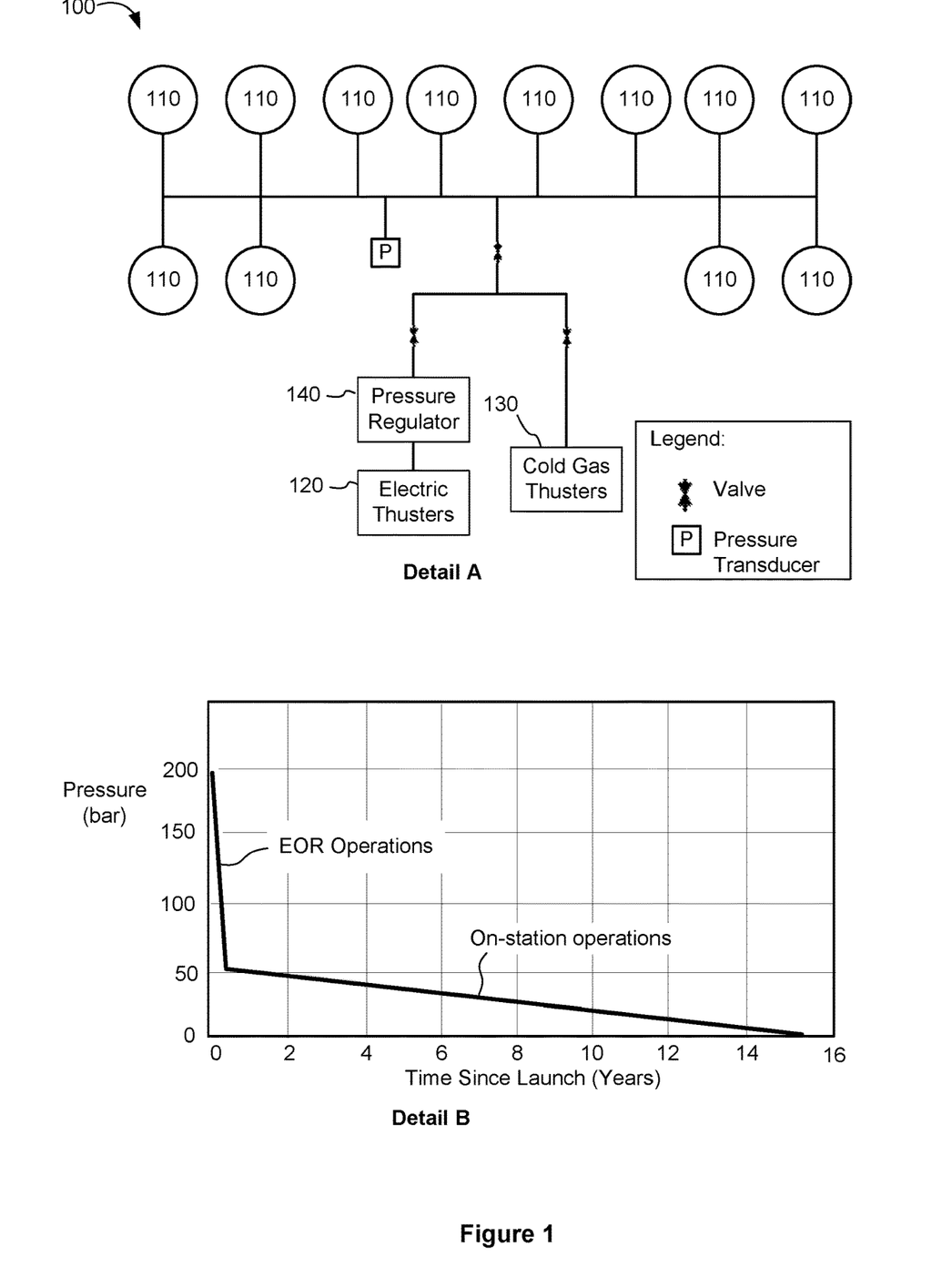
FIG. 1 illustrates a propulsion system of a spacecraft in the absence of the presently disclosed techniques.

The problem addressed by the present disclosure may be better appreciated by referring first to FIG. 1. Detail A of FIG. 1 illustrates a propulsion system 100, in the absence of the presently disclosed techniques, including a number of pressurant tanks 110 pneumatically coupled with both of one or more electric thruster(s) 120 and one or more cold gas thruster(s) 130. The pressurant tanks 110 may be configured to store, for example, xenon, argon, krypton, or other high atomic number noble gas with which the electric thruster(s) 120 and the cold gas thruster(s) 130 are operable. A pressure regulator 140 may be disposed between and pneumatically coupled with the pressurant tanks 110 and the electric thruster(s) 120. The pressure regulator 140 may be configured to reduce and regulate pressure of the gas fed to the electric thruster(s) 110. For example, the pressure regulator 140 may provide a regulated pressure of about 2.5 atmospheres to the electric thruster(s) 120.

Detail B illustrates, as a function of time, pressure of tanks 110 for the propulsion subsystem 100 illustrated in Detail A for a modelled fifteen year mission profile. During a portion of the first year of the modeled mission profile, orbit raising operations with electric thrusters ("EOR operations") are carried out to raise the orbit from the launch vehicle transfer orbit to geosynchronous orbit. Xenon pressure during this period drops from about 200 bar to about 50 bar. Thereafter, on-station operations are periodically carried out for station keeping, attitude control and momentum management. These operations result in continued decline in tank pressure but the rate of decline is substantially slower than exhibited during the orbit raising operations. It may be observed that the pressure reaches 35 bar at about the fifth year. For the example fifteen year mission, the xenon is not exhausted until end of life after the fifteenth year, and the electric thrusters, normally operable at pressures on the order of 2-3 bar are effectively available for use throughout life. In the illustrated example, however, as much as ten years of the mission life propellant pressure may be too low (<35 bar) for effective use of the cold gas thrusters.

Figure 2:
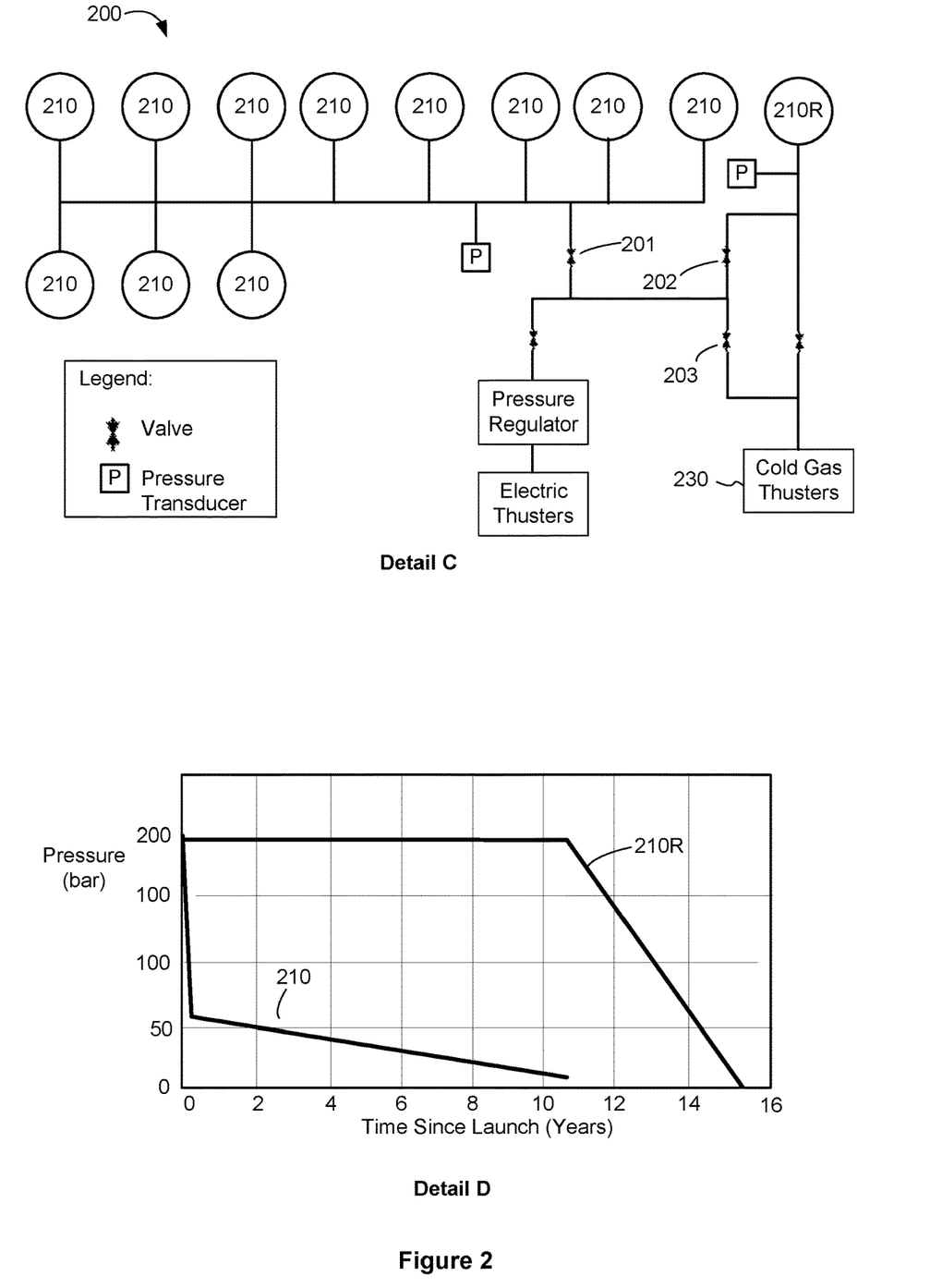
FIG. 2 illustrates a simplified block diagram of a spacecraft propulsion system, according to an implementation.

In an implementation, the above-mentioned problem is substantially mitigated by maintaining at least one pressurant tank as a reserve. FIG. 2 illustrates a simplified block diagram of a propulsion system 200, according to an implementation. At least one reserve pressurant tank 210R is isolatable from pressurant tanks 210 and may be maintained at a relatively high pressure until near the end of the mission. Referring to Detail C, in the illustrated implementation, the reserve pressurant tank 210R may be isolated by commandable valves 202 and 203. As a result, gas used by the electric thrusters during at least a first mission phase may be provided only by pressurant tanks 210 and not by the reserve pressurant tank 210R, until such time as pressurant tanks 210 are largely or completely depleted. In the illustrated example, this occurs in about the tenth year of the mission, at which time valve 201 may be closed and valve 202 may be opened. As a result, starting at about the tenth year, xenon pressure in the reserve tank 210R will decline as gas is consumed by the electric thrusters. Referring now to Detail D, It may be observed that the pressure of reserve tank 210R does not drop below 35 bar until very near the normal mission end-of-life. Thus, gas in the reserve tank 210R may be stored at an approximately constant high pressure for two thirds or more of the mission life and may be available, in case of need, to the cold gas thrusters 230 at a pressure greater than 35 bar for nearly the entirety of a 15 year mission. More generally, for a substantial portion of the mission (half or more of the mission) pressure of inert gas in the reserve tank 210R is at least 1.5 times higher than pressure of inert gas in tanks 210.

Figure 3:
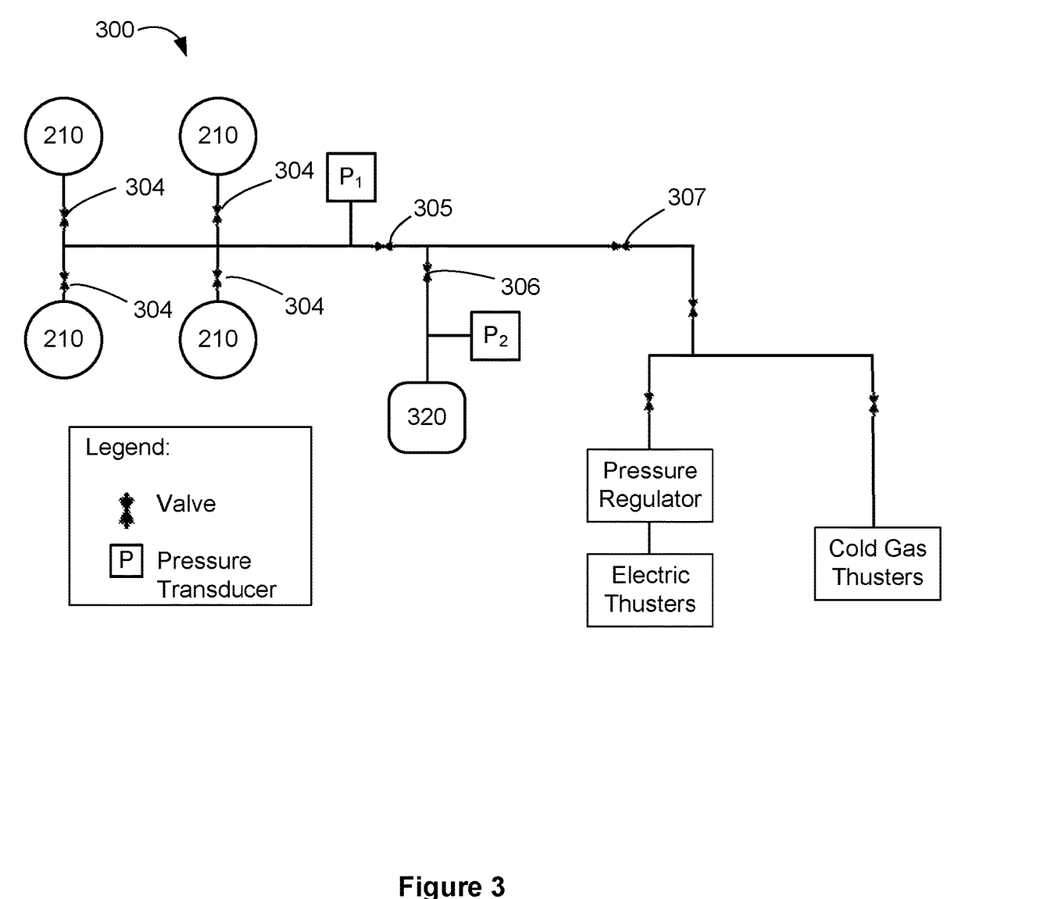
FIG. 3 illustrates a simplified block diagram of a propulsion system, according to another implementation.

Alternatively or in addition, a propulsion subsystem may include one or more condensers and tank isolation valves. FIG. 3 illustrates a simplified block diagram of a propulsion system, according to another implementation. In the illustrated example, commandable isolation valves are disposed between a condenser 320 and one or more pressurant tanks 210. More particularly, in the illustrated implementation, a commandable isolation valve 306 is disposed such that the condenser 320 may be pneumatically coupled with or isolated from the commandable isolation valves 305 and 307. In addition, commandable isolation valves 304 are disposed such that each respective pressurant tank 210 may be pneumatically coupled with or isolated from the condenser 320 and the commandable isolation valve 305.

The condenser 320 may be a temperature-controlled pressure vessel having an ullage volume that may be used to scavenge gas from one or more pressurant tanks 210. The gas, advantageously, may be xenon or other inert noble gas that has a condensation temperature above −60 C at a pressure in the range of 70-110 bar, for example. In order to scavenge pressurant from a partially depleted pressurant tank 210, the condenser 320 may be cooled to a temperature below the condensation temperature of the inert gas. The condenser 320 may be cooled to a temperature below the condensation temperature of the inert gas while being isolated from pressurant tanks 210 by commandable valve 305 and/or commandable valves 306 and while being isolated from the electric and cold gas thrusters by commandable valves 306 and/or 307. As a result of such condensation of the inert gas, a pressure $P_2$ of condenser 320 may drop to a pressure less than a pressure $P_1$ of pressurant tanks 210. Then, the condenser 320 may be pneumatically coupled, by way of commandable valves 305, 306 and one or more of commandable valves 304 with at least one pressurant tank 210. As a result, inert gas from the at least one pressurant tank 210 will be able to flow to the condenser 320 until pressure $P_1$ and pressure $P_2$ are approximately equal. Then, one or more of commandable valves 305, 306 and 304 may be closed such that the condenser 320 is isolated from the pressurant tanks 210. Temperature of condenser 320 may then be allowed or caused to increase, with a resulting increase in pressure. Inert gas from the condenser 320 may be made available to either or both of the electric thrusters and the cold gas thrusters by opening commandable valves 306 and 307, in the illustrated example.

In some implementations, the condenser 320 may include a pressure vessel and an active thermal control arrangement configured to control a temperature of the pressure vessel. The active thermal control arrangement may be configured to selectively cool or heat the pressure vessel. The active thermal control arrangement may include a heat exchanger, an isothermal mounting panel, one or more heat pipes and/or a thermostatically controlled heater. Pressure vessel cooling (heat rejection) may be accomplished by way of selectively coupling the pressure vessel with a thermal radiator. The coupling may be or include heat pipe or thermally conductive heat straps, for example. Alternatively, or in addition, the pressure vessel may be cooled using an active technique, for example a cryocooler or thermoelectric (Peltier) device.

Figure 4:
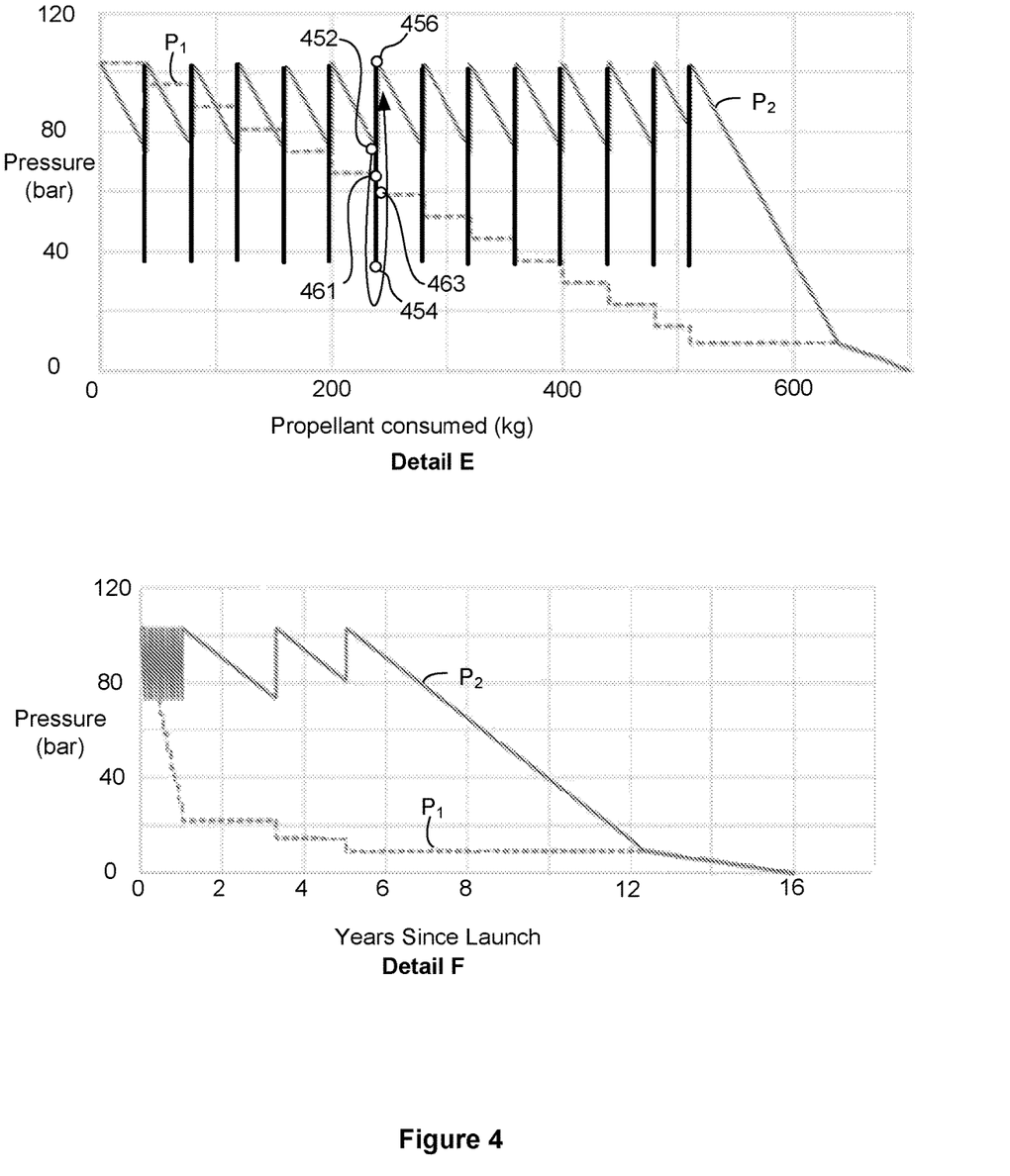
FIG. 4 illustrates a plot of pressures as a function of propellant consumption and of time for a modeled spacecraft mission life, according to an implementation.

FIG. 4 illustrates a plot of pressures $P_1$ and $P_2$, modeled at the locations shown in FIG. 3, as a function of propellant consumption (Detail E) and of time (Detail F) for a modeled spacecraft mission life. Referring first to Detail E, it may be observed that pressure $P_2$ exhibits a characteristic "sawtooth" pattern. The sawtooth pattern includes a series of downslope portions in which P1 declines from about 100 bar to about 75 bar. During these downslope portions of the modeled mission, referring to Detail 3, commandable valves 306 and 307 may be open and operation of the electric and/or cold gas thrusters consume a portion of the inert gas stored in the ullage volume of condenser 320, with a consequent drop in pressure $P_2$ of the ullage volume.

The downslope portions are separated by propellant scavenging operations that result in a vertical pressure excursion of $P_2$ that may be produced even in the absence of thruster operation. At a start of a scavenging operation, commandable valve 306 may be closed and the condenser 320 may be cooled to a temperature below the condensation temperature of the inert gas with a consequent abrupt drop in pressure $P_2$ of the ullage volume. For example, referring again to Detail E, pressure $P_2$, in one illustrated scavenging operation, drops from about 75 bar, at point 452 to a pressure below 40 bar at point 454. Then, in the modelled profile, and referring again to FIG. 3, condenser 320 may be pneumatically coupled with inert gas stored in pressurant tanks 210. More particularly, commandable valves 306, 305 and at least one commandable valve 304 may be opened such that a portion of inert gas from at least one of the pressurant tanks 210 may flow into condenser 320 so as to equalize pressure. As a result, referring again to FIG. 4, pressure $P_1$ may decrease and pressure $P_2$ may increase. For example, in the illustrated scavenging operation, pressure $P_1$ decreases from a pressure of about 65 bar, at point 461 to a pressure of about 60 bar at point 463 while pressure $P_2$ increases from a pressure below 40 bar at point 454 to a pressure of about 60 bar at point 463. Then, in the modelled profile, and referring again to FIG. 3, condenser 320 may be pneumatically isolated from the pressurant tanks 210 by, for example, closing commandable valve 305. A temperature of condenser 320 may then be increased, with a result that, referring again to FIG. 4, $P_2$ increases from a pressure of about 60 bar at point 463 to a pressure of about 100 bar at point 456. The temperature of condenser 320 may be increased passively, by, for example, decoupling the condenser from the thermal radiator or other cooling means. Alternatively or in addition the temperature of condenser 320 may be increased actively with, for example, thermostatically controlled heaters.

Detail F of FIG. 4 illustrates a plot of pressures $P_1$ and $P_2$, as a function of time for the modeled spacecraft mission life. For clarity of illustration, pressure excursions below 75 bar that are associated with scavenging operation cycles are omitted from the plot. It may be observed that, although pressure $P_1$ decreases below 35 bar during the first year of the modeled mission life, pressure $P_2$ remains above 35 bar and inert gas is available, in case of need, to the cold gas thrusters at a pressure greater than 35 bar for over ten years.

Figure 5:
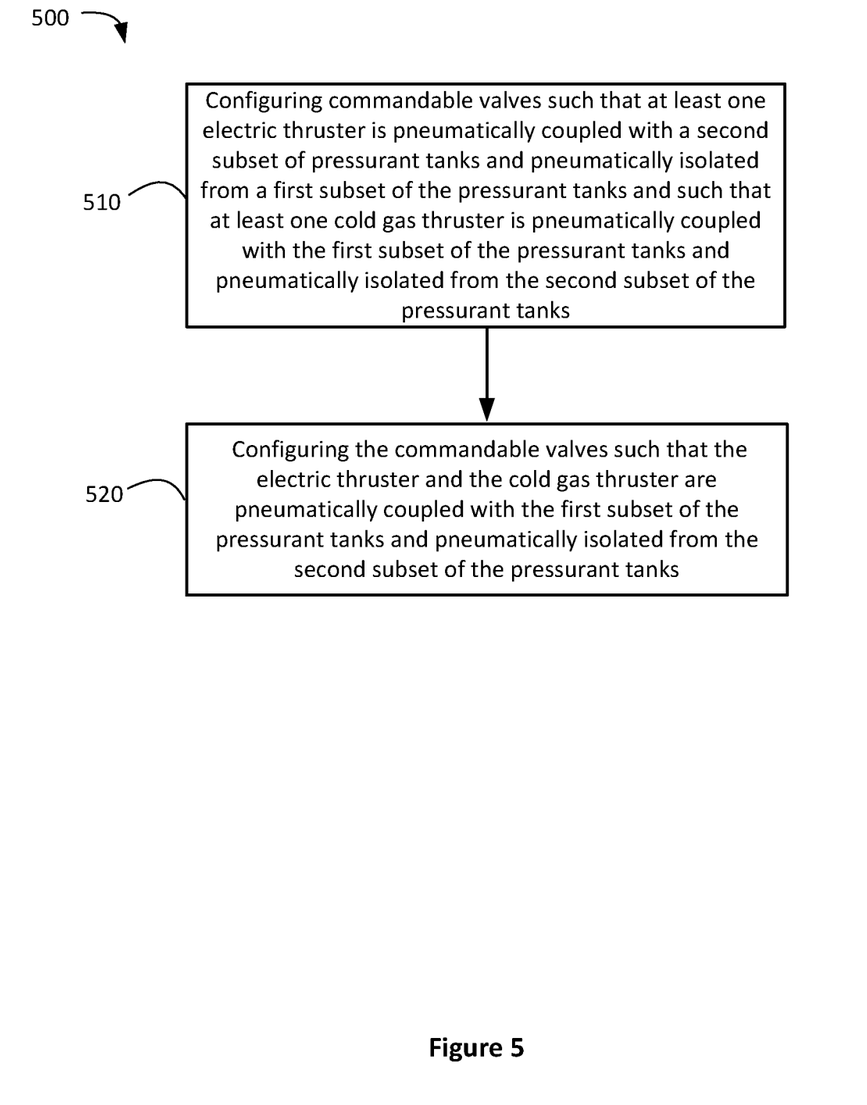
FIG. 5 illustrates a process flow diagram for operating a spacecraft, according to an implementation.

FIG. 5 illustrates a process flow diagram for operating a spacecraft, according to an implementation. The spacecraft, as described hereinabove, may have a mission life, and include a propulsion system that includes an inert gas stored in a set of pressurant tanks, at least one electric thruster operable with the inert gas, at least one cold gas thruster operable with the inert gas, and a pneumatic arrangement including commandable valves, the pneumatic arrangement configured such that a first subset of the pressurant tanks is isolatable, by the commandable valves, from a second subset of the pressurant tanks. A method 500 may start, at block 510, in a first mission phase, with configuring the commandable valves such that the electric thruster is pneumatically coupled with the second subset of the pressurant tanks and pneumatically isolated from the first subset of the pressurant tanks and such that the cold gas thruster is pneumatically coupled with the first subset of the pressurant tanks and pneumatically isolated from the second subset of the pressurant tank. At block 520, the method may continue in a second mission phase, subsequent to the first mission phase, by configuring the commandable valves such that the electric thruster and the cold gas thruster are pneumatically coupled with the first subset of the pressurant tanks and pneumatically isolated from the second subset of the pressurant tanks.

Figure 6:
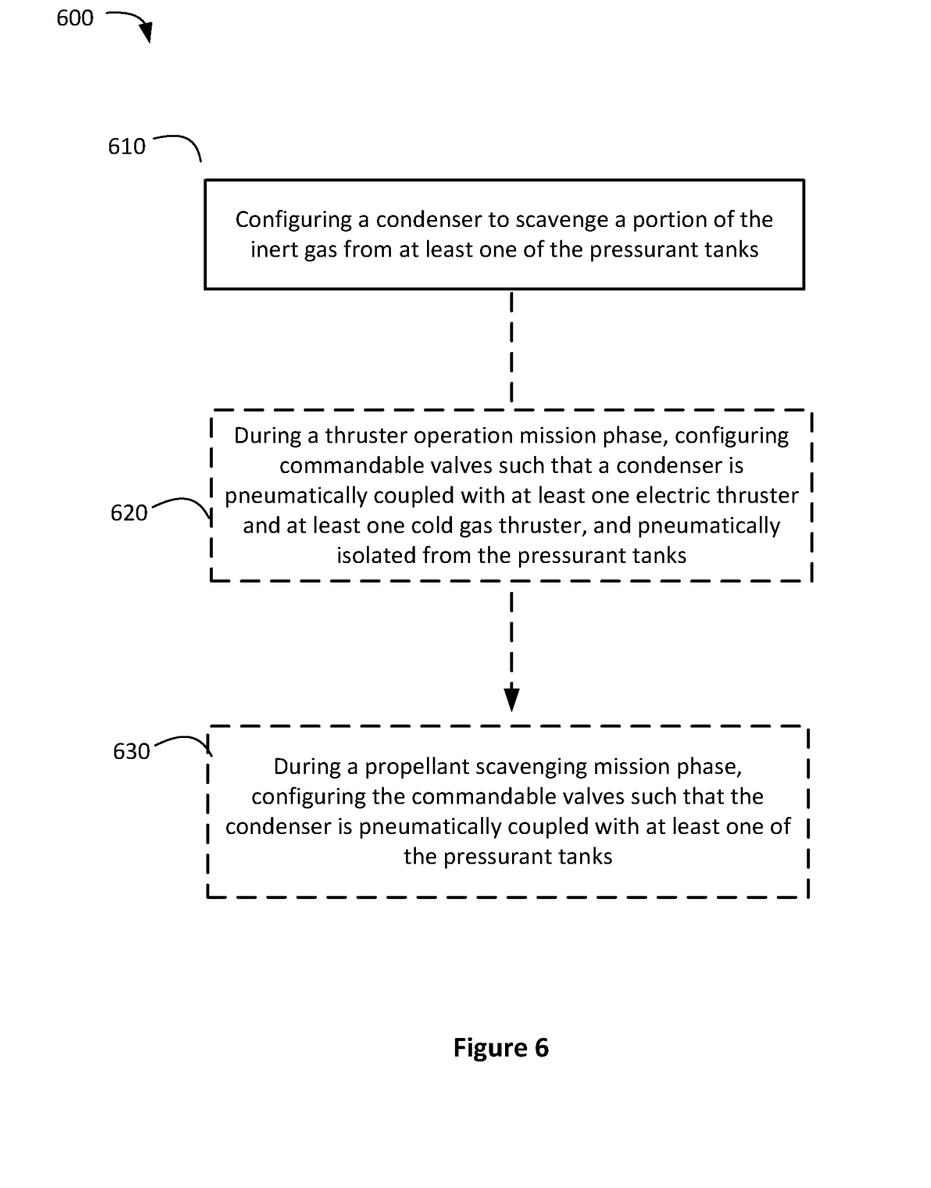
FIG. 6 illustrates a process flow diagram for operating a spacecraft, according to another implementation.

FIG. 6 illustrates a process flow diagram for operating a spacecraft, according to another implementation. As described hereinabove, the spacecraft may include a propulsion system for use during a mission life of the spacecraft, the propulsion system including: an inert gas stored in a set of pressurant tanks, at least one electric thruster operable with the inert gas, at least one cold gas thruster operable with the inert gas, a condenser, and a pneumatic arrangement coupling the pressurant tanks, the electric thruster and the condenser, the pneumatic arrangement including commandable isolation valves such that each pressurant tank is selectably isolated from or pneumatically coupled with the condenser. A method 600 may include, at block 610, configuring the condenser to scavenge a quantity of the inert gas from at least one of the pressurant tanks. The method 600 may optionally include at least one thruster operation mission phase, and at least one propellant scavenging mission phase. At block 620, during the thruster operation mission phase, the commandable valves may be configured such that the condenser is pneumatically coupled with the electric thruster and the cold gas thruster and pneumatically isolated from the pressurant tanks. At block 630, during the propellant scavenging mission phase, the commandable valves may be configured such that the condenser is pneumatically coupled with at least one of the pressurant tanks.

As described hereinabove, the inert gas may, advantageously, have a condensation temperature above −60 C at a pressure in the range of 70-110 bar. The condenser may include a pressure vessel and an active thermal control arrangement configured to control a temperature of the condenser. Configuring the condenser to scavenge the quantity of the inert gas may include the active thermal control arrangement cooling the pressure vessel to a temperature below the condensation temperature.

Thus, techniques for spacecraft propellant management have been described. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:
1. A spacecraft comprising:
a propulsion system for use during a mission life of the spacecraft, the propulsion system including:
an inert gas stored in pressurant tanks;
one or more electric thrusters operable with the inert gas;
one or more cold gas thrusters operable with the inert gas;
a pressure regulator disposed between and pneumatically coupled with the pressurant tanks and the one or more electric thrusters; and a pneumatic arrangement including commandable valves, the pneumatic arrangement configured such that a first subset of the pressurant tanks is isolatable, by the commandable valves, from a second subset of the pressurant tanks; wherein
in a first mission phase, the commandable valves are configured such that the one or more electric thrusters are pneumatically coupled, by way of the pressure regulator, with the second subset of the pressurant tanks and pneumatically isolated from the first subset of the pressurant tanks and such that the one or more cold gas thrusters are pneumatically coupled so as receive pressurant gas from the first subset of the pressurant tanks, not by way of the pressure regulator, and are pneumatically isolated from the second subset of the pressurant tanks; and
in a second mission phase, subsequent to the first mission phase, the commandable valves are configured such that the one or more electric thrusters and the one or more cold gas thrusters are pneumatically coupled, by way of the pressure regulator, with the first subset of the pressurant tanks and pneumatically isolated from the second subset of the pressurant tanks and such that the one or more cold gas thrusters receive pressurant gas from the first subset of the pressurant tanks, not by way of the pressure regulator.

2. The spacecraft of claim 1, wherein, for a substantial portion of the first mission phase, a pressure of the inert gas in the first subset of the pressurant tanks is at least 1.5 times higher than a pressure of the inert gas in the second subset the pressurant tanks.

3. An apparatus comprising:
a propulsion system for use during a mission life of a spacecraft, the propulsion system including:
an inert gas stored in pressurant tanks;
one or more electric thrusters operable with the inert gas;
one or more cold gas thrusters operable with the inert gas;
a pressure regulator disposed between and pneumatically coupled with the pressurant tanks and the one or more electric thrusters; and
a pneumatic arrangement including commandable valves, the pneumatic arrangement configured such that a first subset of the pressurant tanks is isolatable, by the commandable valves, from a second subset of the pressurant tanks; wherein:
in a first mission phase, the commandable valves are configured such that the one or more electric thrusters are pneumatically coupled, by way of the pressure regulator, with the second subset of the pressurant tanks and pneumatically isolated from the first subset of the pressurant tanks and such that the one or more cold gas thrusters are pneumatically coupled so as receive pressurant gas from the first subset of the pressurant tanks, not by way of the pressure regulator, and are pneumatically isolated from the second subset of the pressurant tanks; and
in a second mission phase, subsequent to the first mission phase, the commandable valves are configured such that the one or more electric thrusters and the one or more cold gas thrusters are pneumatically coupled, by way of the pressure regulator, with the first subset of the pressurant tanks and pneumatically isolated from the second subset of the pressurant tanks and such that the one or more cold gas thrusters receive pressurant gas from the first subset of the pressurant tanks, not by way of the pressure regulator.

4. A method comprising:
operating a spacecraft, the spacecraft having a mission life, and including a propulsion system that includes an inert gas stored in pressurant tanks, at least one electric thruster operable with the inert gas, at least one cold gas thruster operable with the inert gas, and a pneumatic arrangement including commandable valves, the pneumatic arrangement configured such that a first subset of the pressurant tanks is isolatable, by the commandable valves, from a second subset of the pressurant tanks; wherein operating the spacecraft includes:
in a first mission phase, configuring the commandable valves such that the at least one electric thruster is pneumatically coupled with the second subset of the pressurant tanks and pneumatically isolated from the first subset of the pressurant tanks and such that the at least one cold gas thruster is pneumatically coupled with the first subset of the pressurant tanks and pneumatically isolated from the second subset of the pressurant tanks; and
in a second mission phase, subsequent to the first mission phase, configuring the commandable valves such that the at least one electric thruster and the at least one cold gas thruster are pneumatically coupled with the first subset of the pressurant tanks and pneumatically isolated from the second subset of the pressurant tanks.

5. The method of claim 4, wherein, for a substantial portion of the first mission phase, a pressure of the inert gas in the first subset of the pressurant tanks is at least 1.5 times higher than a pressure of the inert gas in the second subset the pressurant tanks.

* * * * *